United States Patent
Wang et al.

(10) Patent No.: US 11,870,551 B2
(45) Date of Patent: *Jan. 9, 2024

(54) MULTI-CODEWORD TRANSMISSION METHOD AND APPARATUS

(71) Applicant: Huawei Technologies Co., Ltd., Guangdong (CN)

(72) Inventors: Xiaona Wang, Chengdu (CN); Jingjing Cheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,939

(22) Filed: Jun. 24, 2022

(65) Prior Publication Data

US 2022/0399949 A1 Dec. 15, 2022

Related U.S. Application Data

(63) Continuation of application No. 16/539,825, filed on Aug. 13, 2019, now Pat. No. 11,411,668, which is a
(Continued)

(30) Foreign Application Priority Data

Feb. 17, 2017 (CN) .......................... 201710087121.8

(51) Int. Cl.
*H04J 13/00* (2011.01)
*H04L 1/00* (2006.01)
(Continued)

(52) U.S. Cl.
CPC ........ *H04J 13/0077* (2013.01); *H04L 1/0003* (2013.01); *H04L 1/0009* (2013.01);
(Continued)

(58) Field of Classification Search
CPC .......... H04J 13/0077; H04J 2203/0089; H04L 1/0003; H04L 1/0009; H04L 1/0046;
(Continued)

(56) References Cited

U.S. PATENT DOCUMENTS

| | | | |
|---|---|---|---|
| 2009/0129496 | A1 | 5/2009 | Zhang et al. |
| 2010/0041408 | A1 | 2/2010 | Caire et al. |

(Continued)

FOREIGN PATENT DOCUMENTS

| | | |
|---|---|---|
| CN | 102137504 A | 7/2011 |
| CN | 103687042 A | 3/2014 |

(Continued)

OTHER PUBLICATIONS

CATT, Multi-panel/multi-TRP transmission, 3GPP TSG RAN WG1#88 R1-1702071, Feb. 13-17, 2017, total 7 pages.
(Continued)

*Primary Examiner* — Hoang-Chuong Q Vu
(74) *Attorney, Agent, or Firm* — WOMBLE BOND DICKINSON (US) LLP

(57) ABSTRACT

This application discloses a multi-codeword transmission method and an apparatus. The method includes: generating, by a network device, downlink control information corresponding to each of a plurality of code words to be sent to a terminal device, where the downlink control information corresponding to each code word includes at least one of the following: a physical downlink shared channel resource element mapping and quasi-co-location indicator, and an antenna port(s), scrambling identity and number of layers; and sending, by the network device, downlink control information corresponding to the plurality of code words to the terminal device. Corresponding apparatuses are further disclosed. According to the technical solutions of this application, the network device generates the downlink control
(Continued)

S101. Generate downlink control information corresponding to each of a plurality of code words to be sent to a terminal device S102. Send downlink control information corresponding to the plurality of code words S103. Demodulate data based on the downlink control information corresponding to the plurality of code words information corresponding to each of the plurality of code words to be sent to the terminal device, and the terminal device may demodulate data for the plurality of code words based on downlink control information corresponding to the plurality of code words. This ensures that the terminal device correctly demodulates data in a multi-codeword transmission scenario.

22 Claims, 4 Drawing Sheets

Related U.S. Application Data continuation of application No. PCT/CN2018/073736, filed on Jan. 23, 2018.

(51) Int. Cl.
*H04L 1/18* (2023.01)
*H04L 1/1812* (2023.01)

(52) U.S. Cl.
CPC .......... *H04L 1/0046* (2013.01); *H04L 1/0056* (2013.01); *H04L 1/1819* (2013.01); *H04J 2203/0089* (2013.01)

(58) Field of Classification Search
CPC ... H04L 1/0056; H04L 1/1819; H04L 5/0051; H04L 5/0094; H04L 5/0035; H04L 1/00; H04L 1/0036; H04B 7/024
See application file for complete search history.

(56) References Cited

U.S. PATENT DOCUMENTS

| | | | |
|---|---|---|---|
| 2010/0272018 A1 | 10/2010 | Furueda et al. | |
| 2011/0212684 A1 | 9/2011 | Nam et al. | |
| 2011/0237283 A1 | 9/2011 | Shan et al. | |
| 2012/0033571 A1 | 2/2012 | Shimezawa et al. | |
| 2013/0114427 A1 | 5/2013 | Maattanen et al. | |
| 2013/0163551 A1 | 6/2013 | He et al. | |
| 2013/0223253 A1 | 8/2013 | Enescu et al. | |
| 2014/0133425 A1* | 5/2014 | Kim | H04L 5/0053 370/329 |
| 2014/0169316 A1* | 6/2014 | Kim | H04L 5/0053 370/329 |
| 2014/0192734 A1 | 7/2014 | Ng et al. | |
| 2014/0192744 A1 | 7/2014 | Zhou et al. | |
| 2014/0254516 A1 | 9/2014 | Lee et al. | |
| 2015/0029910 A1 | 1/2015 | He et al. | |
| 2015/0223216 A1 | 8/2015 | Han et al. | |
| 2016/0013903 A1 | 1/2016 | Kim et al. | |
| 2016/0020879 A1* | 1/2016 | Shimezawa | H04L 5/0048 370/329 |
| 2016/0128037 A1 | 5/2016 | Park et al. | |
| 2016/0212746 A1 | 7/2016 | Wang et al. | |
| 2016/0248561 A1* | 8/2016 | Davydov | H04L 5/0048 |
| 2016/0338129 A1 | 11/2016 | Moulsley | |
| 2017/0079017 A1 | 3/2017 | Kim et al. | |
| 2017/0201360 A1 | 7/2017 | Shin et al. | |
| 2017/0288743 A1* | 10/2017 | Nam | H04B 7/0617 |
| 2018/0042028 A1* | 2/2018 | Nam | H04L 5/0035 |
| 2018/0048372 A1* | 2/2018 | Sun | H04L 1/0026 |
| 2018/0083680 A1* | 3/2018 | Guo | H04B 7/088 |
| 2018/0132227 A1 | 5/2018 | Ghosh et al. | |
| 2018/0159707 A1* | 6/2018 | Onggosanusi | H04L 69/324 |
| 2018/0175993 A1 | 6/2018 | Onggosanusi et al. | |
| 2019/0158992 A1 | 5/2019 | Lee et al. | |
| 2019/0165841 A1 | 5/2019 | Dong et al. | |
| 2019/0379431 A1* | 12/2019 | Park | H04B 7/0408 |
| 2020/0008231 A1 | 1/2020 | Vilaipornsawai et al. | |

FOREIGN PATENT DOCUMENTS

| | | |
|---|---|---|
| CN | 104685807 A | 6/2015 |
| CN | 104704750 A | 6/2015 |
| CN | 104753633 A | 7/2015 |
| CN | 104919724 A | 9/2015 |
| WO | 2013000253 A1 | 1/2013 |

OTHER PUBLICATIONS

Huawei et al., "Correction on DCI format 5A", 3GPP TSG RAN WG1 Meeting #87 R1-1612827,Reno, USA, Nov. 14-18, 2016, total 5 pages.

Huawei, HiSilicon, Details of QCL assumptions and related RS design considerations, 3GPP TSG RAN WG1 Meeting #88 R1-1701697, Feb. 13-17, 2017, total 7 pages.

Huawei, HiSilicon, Discussion on enhancements for non-coherent JT, 3GPP TSG RAN WG1 Meeting #88 R1-1703063, Feb. 6, 2017, pp. 1-6,total 8 pages.

Intel Corporation, Enhancements and TP for non-coherent JT, 3GPP TSG RAN WG1 Meeting#88 R1-1702171, Feb. 7, 2017, pp. 1-5,total 7 pages.

Intel Corporation,"On codeword to MIMO layer mapping",3GPP TSG RAN WG1 Meeting #87 R1-1611973,Reno, USA Nov. 14-18, 2016,total 3 pages.

Jia Xuemin, The Study of Downlink Mu-Mimo Technology in LTE—a System, Beijing University of Posts and Telecommunications, 2013, 2 pages (abstract).

Qualcomm Incorporated: "CW to Layer Mapping",3GPP Draft; R1-1702596, Feb. 12, 2017, XP051209750, total 7 pages.

S. S. A. Abbas, S. J. Thiruvengadam and M. Punitha, "Realization of PDSCH transmitter and receiver architecture for 3GPP-LTE advanced," 2016 International Conference on Wireless Communications, Signal Processing and Networking (WiSPNET), 2016, pp. 1-6, doi: 10.1109/WiSPNET.2016.7566077.

Samsung: "Enhancements for non-coherent JT", 3GPP Draft; R1-1702898, vol. RAN WG1Ï¼œNo. Athens, Greece; Feb. 13, 2017ä‚€Feb. 17, 2017, Feb. 12, 2017, XP051210042, 4 pages.

Zte et al: "Enhancements for nonä‚ €coherent JT", 3GPP Draft; R1-1701839, vol. RAN WG1Ï¼œNo. Athens, Greece; Feb. 13, 2017ä‚€ Feb. 17, 2017, Feb. 12, 2017, XP051209005, 4 pages.

Huawei, HiSilicon, Multi-panel based DL MIMO transmission. 3GPP TSG RAN WG1 Meeting #87, Reno, U.S.A, Nov. 14-18, 2016, R1-1611664, 4 pages.

* cited by examiner

MULTI-CODEWORD TRANSMISSION METHOD AND APPARATUS

CROSS-REFERENCE TO RELATED APPLICATIONS

This application is a continuation of U.S. patent application Ser. No. 16/539,825, filed on Aug. 13, 2019, which is a continuation of International Application No. PCT/CN2018/073736, filed on Jan. 23, 2018, which claims priority to Chinese Patent Application No. 201710087121.8, filed on Feb. 17, 2017. All of the afore-mentioned patent applications are hereby incorporated by reference in their entireties.

TECHNICAL FIELD

This application relates to the field of communications technologies, and in particular, to a multi-codeword transmission method and an apparatus.

BACKGROUND

As a long term evolution-advanced (LTE-A) requirement is proposed, people pay increasing attention to cell average spectral efficiency and cell edge spectral efficiency. In both an upstream and a downstream of an LTE-A system, there are frequency division systems that use orthogonal frequency division multiplexing (OFDM) as a basic multiple access multiplexing mode. There is almost no interference problem inside a cell because of complete orthogonal frequency division, but interference processing at an edge of the cell is relatively difficult.

To improve cell edge spectral efficiency, a non-coherent joint transmission (NCJT) transmission mode is proposed. NCJT means that a plurality of transmission nodes serve one terminal device at a same time, that is, the terminal device may receive data from the plurality of transmission nodes at the same time. Transmission between two transmission points (TP) is used as an example. In a schematic diagram of coordinated multipoint transmission/reception shown in FIG. 1, a first code word (Code Word 1, CW 1), or referred to as a transport block, is transmitted to a terminal device through a TP 1, and a second code word CW 2 is transmitted to the terminal device through a TP 2. Since strict synchronization among a plurality of transmission nodes is not required, and user experience can be improved through joint transmission performed by the plurality of transmission nodes, this transmission technology as a main transmission mode of further enhancements to coordinated multipoint operation (Fe-CoMP) has drawn extensive attention and has been widely discussed.

However, in prior-art LTE and LTE-A technologies, one terminal device receives only one or more code words from one transmission node at a same time.

Therefore, a problem that a terminal device cannot correctly demodulate data in a multi-codeword transmission scenario needs to be resolved urgently.

SUMMARY

This application provides a multi-codeword transmission method and an apparatus, to resolve a problem that a terminal device cannot correctly demodulate data in a multi-codeword transmission scenario.

According to an aspect, a multi-codeword transmission method is provided, including: generating, by a network device, downlink control information corresponding to each of a plurality of code words to be sent to a terminal device, where the downlink control information corresponding to each code word includes at least one of the following: a physical downlink shared channel (PDSCH) resource element mapping and quasi-co-location indicator, and an antenna port(s), scrambling identity and number of layers; and sending, by the network device, downlink control information corresponding to the plurality of code words to the terminal device. The network device generates the downlink control information corresponding to each of the plurality of code words to be sent to the terminal device, and the terminal device may demodulate data based on the downlink control information corresponding to the plurality of code words. This ensures that the terminal device correctly demodulates data in a multi-codeword transmission scenario.

According to another aspect, a multi-codeword transmission method is provided, including: receiving, by a terminal device, downlink control information that is corresponding to a plurality of code words and that is from a network device, where in the downlink control information corresponding to the plurality of code words, downlink control information corresponding to each code word includes at least one of the following: a physical downlink shared channel (PDSCH) resource element mapping and quasi-co-location indicator, and an antenna port(s), scrambling identity and number of layers; and demodulating, by the terminal device, data based on the downlink control information corresponding to the plurality of code words. The terminal device receives the downlink control information that is corresponding to each of the plurality of code words and that is generated by the network device, and may demodulate the data based on the downlink control information corresponding to the plurality of code words. This ensures correct data demodulation.

According to still another aspect, a multi-codeword transmission method is provided, including: generating, by a network device, downlink control information corresponding to each of a plurality of code words to be sent to a terminal device, where the downlink control information corresponding to each code word includes: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and sending, by the network device, downlink control information corresponding to the plurality of code words to the terminal device. The network device generates the downlink control information corresponding to each of the plurality of code words to be sent to the terminal device, and the terminal device may demodulate data based on the downlink control information corresponding to the plurality of code words. This ensures that the terminal device correctly demodulates data in a multi-codeword transmission scenario.

According to still another aspect, a multi-codeword transmission method is provided, including: receiving, by a terminal device, downlink control information that is corresponding to a plurality of code words and that is from a network device, where in the downlink control information corresponding to the plurality of code words, downlink control information corresponding to each code word includes: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and demodulating, by the terminal device, data based on the downlink control information corresponding to the plurality of code words. The terminal device receives the downlink control information that is corresponding to each of the plurality of code words and that is generated by the network device, and may demodulate the data based on the downlink control information corresponding to the plurality of code words. This ensures correct data demodulation.

In an embodiment of the foregoing aspects, the downlink control information corresponding to each code word further includes at least one of the following: a modulation and coding scheme (MCS), a new data indicator (NDI), and a redundancy version (RV). In this implementation, the downlink control information corresponding to each code word may further include another parameter. The MCS is used to provide information related to a modulation mode, an encoding rate, and a transport block size to the terminal device. The NDI is used to empty a soft buffer for initial transmission. The RV is used to provide redundancy version information.

In another embodiment of the foregoing aspects, the PDSCH resource element mapping and quasi-co-location indicator includes at least one of the following parameters: a PDSCH start point, a multicast-broadcast single-frequency network (MBSFN) subframe configuration, a beam management reference signal configuration, and a channel state information-reference signal (CSI-RS) configuration. In this implementation, the parameters included in the PDSCH resource element mapping and quasi-co-location indicator are described in detail.

In still another embodiment of the foregoing aspects, the PDSCH resource element mapping and quasi-co-location indicator carries at least one of an antenna port, a scrambling identity, and a quantity of layers.

In still another embodiment of the foregoing aspects, the antenna port includes a demodulation reference signal (DMRS) port, the scrambling identity includes DMRS scrambling information, and the quantity of layers includes a quantity of DMRS layers.

According to still another aspect, a network device is provided. The network device has a function of implementing behavior of the network device in the foregoing methods. The function may be implemented by hardware, or may be implemented by hardware by executing corresponding software. The hardware or software includes one or more modules corresponding to the foregoing function.

In an embodiment, the network device includes: a processing unit, configured to generate downlink control information corresponding to each of a plurality of code words to be sent to a terminal device, where the downlink control information corresponding to each code word includes at least one of the following: a physical downlink shared channel (PDSCH) resource element mapping and quasi-co-location indicator, and an antenna port(s), scrambling identity and number of layers; and a sending unit, configured to send downlink control information corresponding to the plurality of code words to the terminal device.

In another embodiment, the network device includes a transceiver, a memory, and a processor. The memory stores a group of program code, and the processor is configured to invoke the program code stored in the memory to perform the following operations: generating downlink control information corresponding to each of a plurality of code words to be sent to a terminal device, where the downlink control information corresponding to each code word includes at least one of the following: a physical downlink shared channel (PDSCH) resource element mapping and quasi-co-location indicator, and an antenna port(s), scrambling identity and number of layers; and sending, by using the transceiver, the downlink control information corresponding to the plurality of code words to the terminal device.

Based on an inventive concept the same as that of the foregoing method, for a principle for resolving a problem by the apparatus and a beneficial effect brought by the apparatus, refer to the foregoing embodiments of the method performed by the network device and beneficial effects brought by the embodiments. Therefore, for implementation of the apparatus, refer to the implementation of the method, and repeated content is not described again.

According to still another aspect, a terminal device is provided. The terminal device has a function of implementing behavior of the terminal device in the foregoing methods. The function may be implemented by hardware, or may be implemented by hardware by executing corresponding software. The hardware or software includes one or more modules corresponding to the foregoing function.

In an embodiment, the terminal device includes: a receiving unit, configured to receive downlink control information that is corresponding to a plurality of code words and that is from a network device, where in the downlink control information corresponding to the plurality of code words, downlink control information corresponding to each code word includes at least one of the following: a physical downlink shared channel (PDSCH) resource element mapping and quasi-co-location indicator, and an antenna port(s), scrambling identity and number of layers; and a demodulation unit, configured to demodulate data based on the downlink control information corresponding to the plurality of code words.

In another embodiment, the terminal device includes a transceiver, a memory, and a processor. The memory stores a group of program code, and the processor is configured to invoke the program code stored in the memory to perform the following operations: receiving, by using the transceiver, downlink control information that is corresponding to a plurality of code words and that is from a network device, where in the downlink control information corresponding to the plurality of code words, downlink control information corresponding to each code word includes at least one of the following: a physical downlink shared channel (PDSCH) resource element mapping and quasi-co-location indicator, and an antenna port(s), scrambling identity and number of layers; and demodulating data based on the downlink control information corresponding to the plurality of code words.

Based on an inventive concept the same as that of the foregoing method, for a principle for resolving a problem by the apparatus and a beneficial effect brought by the apparatus, refer to the foregoing embodiments of the method performed by the terminal device and beneficial effects brought by the embodiments. Therefore, for implementation of the apparatus, refer to the implementation of the method, and repeated content is not described again.

According to still another aspect, a network device is provided. The network device has a function of implementing behavior of the network device in the foregoing methods. The function may be implemented by hardware, or may be implemented by hardware by executing corresponding software. The hardware or software includes one or more modules corresponding to the foregoing function. In an embodiment, the network device includes: a processing unit, configured to generate downlink control information corresponding to each of a plurality of code words to be sent to a terminal device, where the downlink control information corresponding to each code word includes: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and a sending unit, configured to send downlink control information corresponding to the plurality of code words to the terminal device.

In another embodiment, the network device includes a transceiver, a memory, and a processor. The memory stores a group of program code, and the processor is configured to invoke the program code stored in the memory to perform the following operations: generating downlink control information corresponding to each of a plurality of code words to be sent to a terminal device, where the downlink control information corresponding to each code word includes: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and sending, by using the transceiver, the downlink control information corresponding to the plurality of code words to the terminal device.

Based on an inventive concept the same as that of the foregoing method, for a principle for resolving a problem by the apparatus and a beneficial effect brought by the apparatus, refer to the foregoing embodiments of the method performed by the network device and beneficial effects brought by the implementations. Therefore, for implementation of the apparatus, refer to the implementation of the method, and repeated content is not described again.

According to still another aspect, a terminal device is provided. The terminal device has a function of implementing behavior of the terminal device in the foregoing methods. The function may be implemented by hardware, or may be implemented by hardware by executing corresponding software. The hardware or software includes one or more modules corresponding to the foregoing function.

In an embodiment, the terminal device includes: a receiving unit, configured to receive downlink control information that is corresponding to a plurality of code words and that is from a network device, where in the downlink control information corresponding to the plurality of code words, downlink control information corresponding to each code word includes at least one of the following: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and a demodulation unit, configured to demodulate data based on the downlink control information corresponding to the plurality of code words.

In another embodiment, the terminal device includes a transceiver, a memory, and a processor. The memory stores a group of program code, and the processor is configured to invoke the program code stored in the memory to perform the following operations: receiving, by using the transceiver, downlink control information that is corresponding to a plurality of code words and that is from a network device, where in the downlink control information corresponding to the plurality of code words, downlink control information corresponding to each code word includes at least one of the following: a physical downlink shared channel (PDSCH) resource element mapping and quasi-co-location indicator, and the PDSCH resource element mapping and quasi-co-location indicator carries at least one of an antenna port, a scrambling identity, and a quantity of layers; and demodulating data based on the downlink control information corresponding to the plurality of code words.

Based on an inventive concept the same as that of the foregoing method, for a principle for resolving a problem by the apparatus and a beneficial effect brought by the apparatus, refer to the foregoing embodiments of the method performed by the terminal device and beneficial effects brought by the implementations. Therefore, for implementation of the apparatus, refer to the implementation of the method, and repeated content is not described again.

Still another aspect of this application provides a computer readable storage medium, where the computer readable storage medium stores an instruction, and when the instruction runs on a computer, the computer is enabled to perform the methods in the foregoing aspects.

Yet another aspect of this application provides a computer program product including an instruction, where when the instruction runs on a computer, the computer performs the method in the foregoing aspects.

BRIEF DESCRIPTION OF DRAWINGS

To describe the technical solutions in embodiments of the present disclosure or in the background more clearly, the following describes the accompanying drawings required for describing the embodiments of the present disclosure or the background.

DESCRIPTION OF EMBODIMENTS

Figure 1:
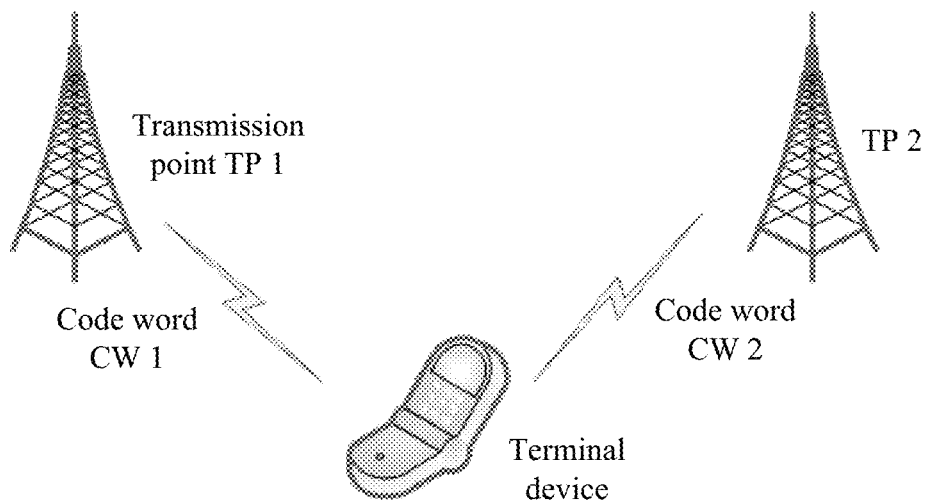
FIG. 1 is a schematic diagram of an example of coordinated multipoint transmission/reception.

The following describes the embodiments of the present disclosure with reference to accompanying drawings in the embodiments of the present disclosure.

A communications system in the embodiments of the present disclosure includes a network device and a terminal device. The network device controls multi-codeword transmission of a transmission node. The communications system may be a global system for mobile communications (GSM) system, a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system), a communications system that integrates various communications technologies (for example, a communications system that integrates an LTE technology and an NR technology), or a subsequent evolved communications system.

The terminal device in this application is a device having a wireless communication function. The terminal device may be a handheld device, an in-vehicle device, a wearable device, or a computing device that has the wireless communication function, another processing device connected to a wireless modem, or the like. In different networks, the terminal device may have different names such as user equipment (UE), an access terminal, a subscriber unit, a subscriber station, a mobile station, a mobile console, a remote station, a remote terminal, a mobile device, a subscriber terminal, a terminal, a wireless communications device, a user agent or a user apparatus, a cellular phone, a cordless telephone set, a session initiation protocol (SIP) phone, a wireless local loop (WLL) station, a personal digital assistant (PDA), or a terminal device in a 5G network or a future evolved network.

The network device in this application is a device that is deployed in a radio access network to provide a wireless communication function. The network device includes but is not limited to: a base station (for example, a Base Transceiver Station (BTS), a NodeB (NB), an evolved NodeB (Evolutional Node B, eNB or eNodeB), a transmission node (for example, a transmission/reception point (TRP) or a transmission point (TP) in an NR system, or a next-generation NodeB (generation nodeB, gNB), a base station or a network device in a future communications network, a relay node, an access point, an in-vehicle device, a wearable device, a wireless fidelity (Wi-Fi) site, a wireless backhaul node, a small cell, a micro cell, and the like. In existing LTE and LTE-A protocols, a downlink control channel corresponds to one or two code words during coordinated multipoint transmission/reception (CoMP). When a downlink control channel carries scheduling information of a plurality of code words, by default in a system, a plurality of code words carried on a physical downlink shared channel (PDSCH) are from one transmission node or from a plurality of transmission nodes synchronized with each other in time/frequency domain. In other words, the plurality of code words have a same large-scale channel experience. The large-scale channel experience includes the following features: delay spread (delay spread), Doppler spread, Doppler shift, an average gain, an average delay, a receive beam number of a terminal device, a transmit/receive channel correlation, a received angle of arrival (AoA), a spatial correlation of a receiver antenna, a primary angle of arrival, an average angle of arrival, AoA spread, and the like. However, in downlink control information, only one set of the following parameters is included: a physical downlink shared channel resource element (PDSCH RE) mapping and quasi-co-location indicator, and an antenna port(s), scrambling identity and number of layers.

Figure 2A:
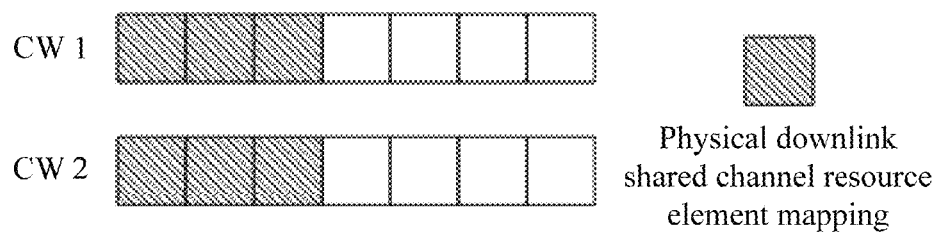
FIG. 2a to FIG. 2c are schematic diagrams of a plurality of possible physical downlink shared channel resource element mappings.
Figure 2B:
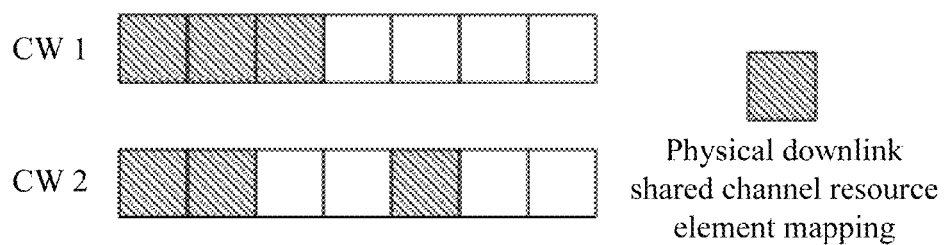
Figure 2C:
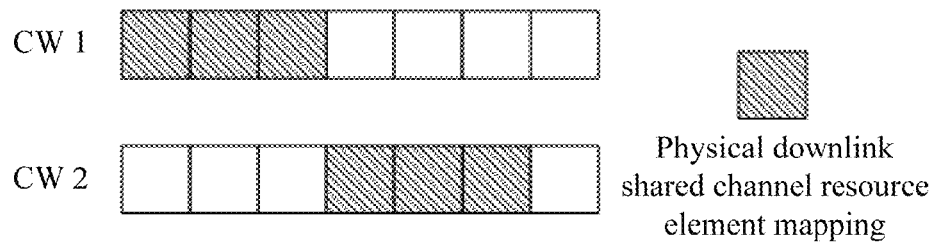

For multi-codeword transmission performed in an NCJT scenario, different code words are transmitted by different transmission nodes; and each transmission node separately performs self-adaptive precoding, that is, a plurality of code words correspond to different large-scale channel experiences, and time/frequency domain resources carried by the plurality of code words may be different. If demodulation of the plurality of code words is implemented according to an existing protocol by using one set of parameters of the PDSCH resource element mapping and quasi-co-location indicator, a high bit error rate of data transmission is caused. Therefore, in actual transmission, downlink control information matching a PDSCH for each transmission node should be considered. In addition, fixed information about an antenna port(s), scrambling identity and number of layers does not match a decoding requirement of all transmission nodes either. A PDSCH resource element mapping is used as an example. As shown in FIG. 2a to FIG. 2c, actual PDSCH resource element mapping information carried in different code words may be exactly the same (as shown in FIG. 2a), partially the same (as shown in FIG. 2b), or even completely different (as shown in FIG. 2c). Therefore, existing configuration information cannot ensure that downlink control information such as a PDSCH resource element mapping and quasi-co-location indicator, and an antenna port(s), scrambling identity and number of layers matches that of all transmission nodes in a case of multi-codeword transmission performed in the NCJT scenario.

The embodiments of the present disclosure provide a multi-codeword transmission method and an apparatus. A network device generates downlink control information corresponding to each of a plurality of code words to be sent to a terminal device, and the terminal device may demodulate data based on the downlink control information corresponding to the plurality of code words. This ensures that the terminal device correctly demodulates data in a multi-codeword transmission scenario.

Multi-codeword transmission scenarios in the embodiments of the present disclosure include: coordinated multi-point transmission/reception, for example, NCJT; multi-codeword transmission performed by using a plurality of beam groups used for one transmission node, for example, high frequency communication based on a plurality of simulated narrow beams; and multi-codeword transmission performed by using different antenna panels used for one transmission node, for example, high frequency communication based on a plurality of panels (multiple panels).

Figure 3:
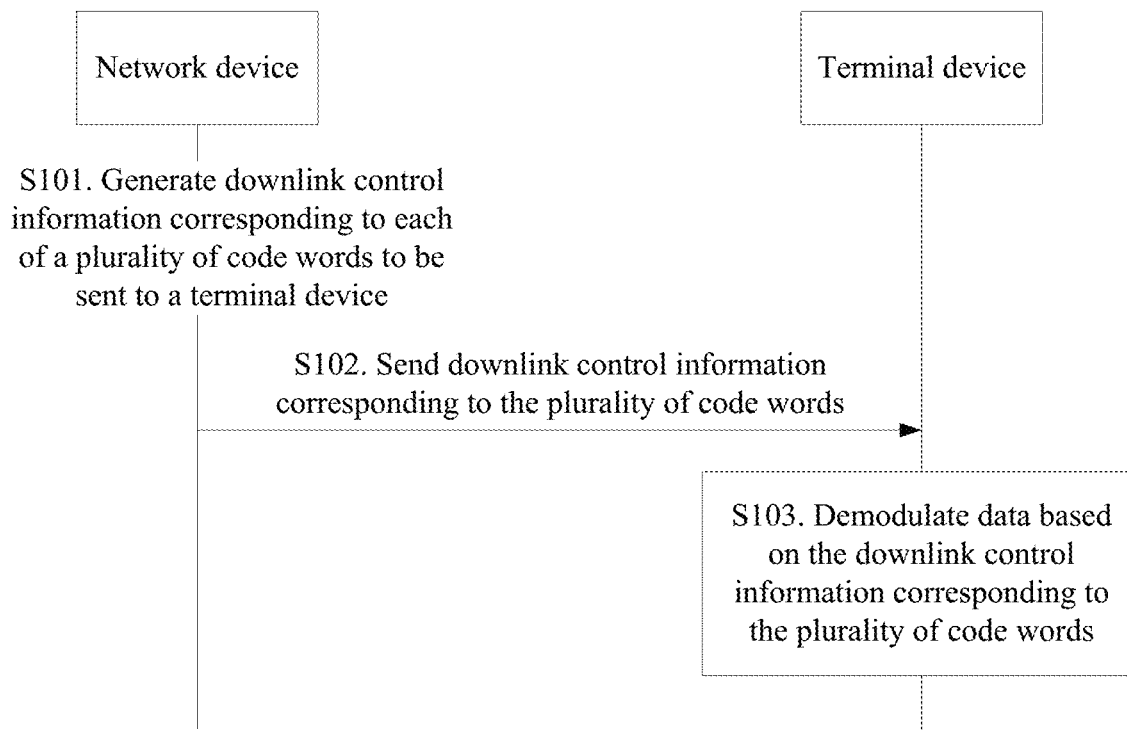
FIG. 3 is a schematic interaction diagram of a multi-codeword transmission method according to an embodiment of the present disclosure.

FIG. 3 is a schematic interaction diagram of a multi-codeword transmission method according to an embodiment of the present disclosure. The method includes the following operations:

S101. A network device generates downlink control information corresponding to each of a plurality of code words to be sent to a terminal device.

In this embodiment, the plurality of code words may be from a plurality of transmission nodes, for example, a plurality of code words used in NCJT in coordinated multi-point transmission/reception; may be from a plurality of beam groups used for one transmission node, for example, a plurality of code words used in high frequency communication that is based on a plurality of simulated narrow beams; or may be from different antenna panels used for one transmission node, for example, a plurality of code words in high frequency communication based on multiple panels. Optionally, the terminal device may be one terminal device or different terminal devices. In this embodiment, before the plurality of transmission nodes, the plurality of beam groups used for one transmission node, or the different antenna panels used for one transmission node send code words, the network device generates the downlink control information (DCI) corresponding to each of the plurality of code words to be sent to the terminal device. The downlink control information corresponding to each code word includes at least one of the following: a PDSCH resource element mapping and quasi-co-location indicator, and an antenna port(s), scrambling identity and number of layers. Optionally, the downlink control information corresponding to each code word includes the PDSCH resource element mapping and quasi-co-location indicator, and the antenna port(s), scrambling identity and number of layers.

The PDSCH mapping and quasi-co-location indicator is used to indicate a quasi-co-location relationship between antenna ports, and corresponds to a quasi-co-location relationship between reference signals of different types. The PDSCH resource element mapping and quasi-co-location indicator includes at least one of the following parameters: a PDSCH start point, a multicast-broadcast single-frequency network (MBSFN) subframe configuration, a beam management reference signal configuration, and a channel state information-reference signal (CSI-RS) configuration. Herein, the reference signals of different types include a beam management reference signal, a CSI-RS, and a demodulation reference signal (DMRS). The beam management reference signal is used to measure a simulated beam, the CSI-RS is used to measure channel state information, and the DMRS is used to demodulate data. The beam management reference signal, the CSI-RS, and the DMRS have a quasi-co-location relationship. This means that one transmission node, one beam group of the same transmission node, or a group of antenna ports of one antenna panel of the transmission node have a same large-scale channel feature. Different transmission points, different beam groups, or different antenna panels that send a plurality of code words correspond to at least two groups of antenna ports. Large-scale channel features may include delay spread, an average delay, Doppler spread, Doppler shift, an average gain, a receive beam number of a terminal device, a transmit/receive channel correlation, a received angle of arrival, a spatial correlation of a receiver antenna, a primary angle of arrival, an average angle of arrival, AoA spread, and the like. A quasi-co-location indicator is used to indicate whether at least two groups of antenna ports have a quasi-co-location relationship as follows: The quasi-co-location indicator is used to indicate whether reference signals sent by the at least two groups of antenna ports are from one transmission point; the quasi-co-location indicator is used to indicate whether reference signals sent by the at least two groups of antenna ports are from one beam group; or the quasi-co-location indicator is used to indicate whether reference signals sent by the at least two groups of antenna ports are from one antenna panel.

The antenna port(s), scrambling identity and number of layers is used to indicate a DMRS port, a DMRS scrambling identity, and a quantity of DMRS layers that correspond to a current code word. In an LTE protocol, a relationship between a DMRS port number and a quantity of DMRS transport layers is: a UE-specific reference signal related to a PDSCH is transmitted from the following antenna ports: p=5, p=7, p=8, p=11, p=13, p={11, 13}, or p=7, 8, . . . , v+6, where v is the quantity of transport layers used for a PDSCH. The DMRS scrambling identity is used to determine a DMRS sending sequence. For detailed definition and application of this parameter, refer to the LTE protocol, and details are not described herein again one by one.

The two parameters, the PDSCH resource element mapping and quasi-co-location indicator and the antenna port(s), scrambling identity and number of layers, are closely related to a code word. If a plurality of code words are transmitted, and the plurality of code words are from different transmission nodes, different beam groups, or different antenna panels, and when a set of the two parameters is used for the plurality of code words, data demodulation fails.

Further, the downlink control information corresponding to each code word further includes at least one of the following: a modulation and coding scheme (Modulation and Coding Scheme, MCS), a new data indicator (NDI), and a redundancy version (RV). The MCS is used to provide information related to a modulation mode, an encoding rate, and a transport block size to the terminal device. The NDI is used to empty a soft buffer for initial transmission. For detailed definition and application of these parameters, refer to the LTE protocol, and details are not described herein again one by one.

In addition to the downlink control information corresponding to each code word, downlink control information may further include more parameters. The following parameters may be transmitted in a DCI 2D format according to the existing LTE protocol. The downlink control information is used by the terminal device to demodulate data. An example in which two TPs transmit two codes words for one UE at a same time is provided, and a case in which more than two code words are transmitted is excluded. The DCI sent by the two TPs includes:

a carrier indicator, indicating a component carrier to which the downlink control information is related;

a resource allocation header (a resource allocation type 0/1);

a resource block allocation, indicating a resource block on a component carrier on which the terminal device should receive a PDSCH;

a transmit power control (TPC) command for a physical uplink control channel (PUCCH), used to schedule secondary carriers in carrier aggregation.

a downlink assignment index, used to inform the terminal device of information related to a quantity of downlink transmissions;

a quantity of hybrid automatic repeat request (HARQ) processes, used to inform the terminal device of a related current HARQ process;

a sounding reference signal (SRS) request, only used in time division duplexing (TDD) to trigger transmission of an uplink sounding reference signal;

a first code word;

a MCS;

an NDI;

an RV;

a PDSCH resource element mapping and quasi-co-location indicator;

an antenna port(s), scrambling identity and number of layers;

a second code word;

a MCS;

an NDI;

an RV;

a PDSCH resource element mapping and quasi-co-location indicator;

an antenna port(s), scrambling identity and number of layers; and a HARQ-ACK resource offset (used for an enhanced physical downlink control channel ePDCCH), used to dynamically control a PUCCH resource that is for a HARQ acknowledgment.

In an embodiment, the PDSCH resource element mapping and quasi-co-location indicator, and the antenna port(s), scrambling identity and number of layers may be included in one parameter set, or included in different parameter sets. In an optional manner, the two parameters, the PDSCH resource element mapping and quasi-co-location indicator, and the antenna port(s), scrambling identity and number of layers, are included in different parameter sets, that is, the two parameters are represented by using parameter sets of two domains. For example, in the foregoing DCI parameter that is used as an example, the two parameters are separately represented. In another optional manner, the two parameters, the PDSCH resource element mapping and quasi-co-location indicator, and the antenna port(s), scrambling identity and number of layers, are included in one parameter set, that is, the two parameters are represented by using a parameter set of one domain. In other words, the PDSCH resource element mapping and quasi-co-location indicator carries an antenna port, a scrambling identity, and a quantity of layers. The PDSCH resource element mapping and quasi-co-location indicator includes at least one of the following parameters: a PDSCH start point, a multicast-broadcast single-frequency network subframe configuration, a beam management reference signal configuration, and a channel state information-reference signal configuration, a DMRS port, a DMRS scrambling information, and a quantity of DMRS layers.

S102. The network device sends downlink control information corresponding to the plurality of code words to the terminal device.

The network device may send, through a physical downlink control channel (PDCCH), the downlink control information corresponding to the plurality of code words to the terminal device. Alternatively, the network device may send, through a plurality of PDCCHs, the downlink control information corresponding to the plurality of code words to the terminal device. The terminal device receives the downlink control information that is corresponding to the plurality of code words and that is from the network device.

S103. The terminal device demodulates data based on the downlink control information corresponding to the plurality of code words.

As the terminal device receives the downlink control information corresponding to each code word, the downlink control information corresponding to the plurality of code words may be used to demodulate the data for the plurality of code words that are from different transmission nodes, different beam groups of one transmission node, or different antenna panels of one transmission node. For a specific data demodulation process, refer to an existing LTE protocol, and details are not described herein again.

According to the multi-codeword transmission method provided in this embodiment of the present disclosure, the network device generates the downlink control information corresponding to each of the plurality of code words to be sent to the terminal device, and the terminal device may demodulate data for the plurality of code words based on the downlink control information corresponding to the plurality of code words. This ensures that the terminal device correctly demodulates data in a multi-codeword transmission scenario.

The foregoing describes in detail the method in the embodiments of the present disclosure, and the following provides the apparatuses in the embodiments of the present disclosure.

Figure 4:
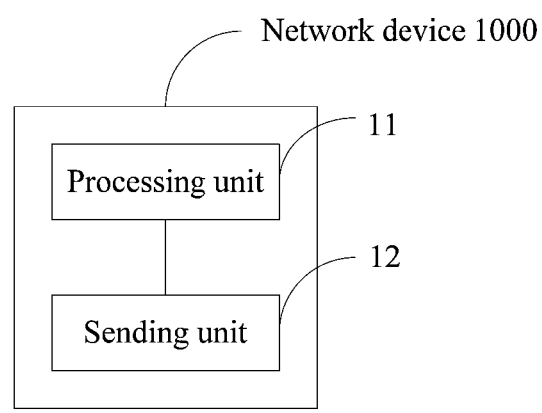
FIG. 4 is a schematic module diagram of a network device according to an embodiment of the present disclosure.

FIG. 4 is a schematic module diagram of a network device according to an embodiment of the present disclosure. The network device 1000 may include a processing unit 11 and a sending unit 12. The processing unit 11 may be configured to control an operation of the network device, for example, perform S101 of generating downlink control information corresponding to each of a plurality of code words to be sent to a terminal device. The sending unit 12 may be configured to communicate with the terminal device, for example, perform S102 of sending the downlink control information corresponding to the plurality of code words to the terminal device. For details, refer to the description in the method embodiment, and details are not described herein again.

According to the network device provided in this embodiment of the present disclosure, the network device generates the downlink control information corresponding to each of the plurality of code words to be sent to the terminal device, and the terminal device may perform demodulation, based on the downlink control information corresponding to each code word, for the plurality of code words that are from different transmission nodes. This ensures correct demodulation.

Figure 5:
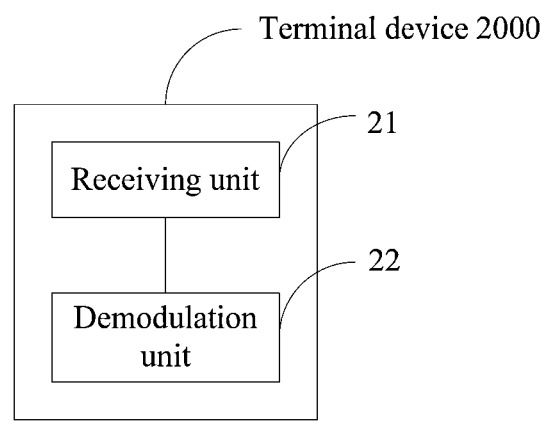
FIG. 5 is a schematic module diagram of a terminal device according to an embodiment of the present disclosure.

FIG. 5 is a schematic module diagram of a terminal device according to an embodiment of the present disclosure. The terminal device 2000 may include a receiving unit 21 and a demodulation unit 22. The receiving unit 21 may be configured to communicate with a network device, for example, receive, after S102 is performed, the downlink control information that is corresponding to the plurality of code words and that is from the network device. The demodulation unit 22 may be configured to control an operation of the terminal device, for example, perform S103 of demodulating data based on the downlink control information corresponding to the plurality of code words. For details, refer to the description in the method embodiment, and details are not described herein again.

According to the terminal device provided in this embodiment of the present disclosure, the terminal device receives the downlink control information that is corresponding to each of the plurality of code words and that is generated by the network device, and may demodulate the data for the plurality of code words based on the downlink control information corresponding to the plurality of code words. This ensures that the terminal device correctly demodulates data in a multi-codeword transmission scenario.

Figure 6:
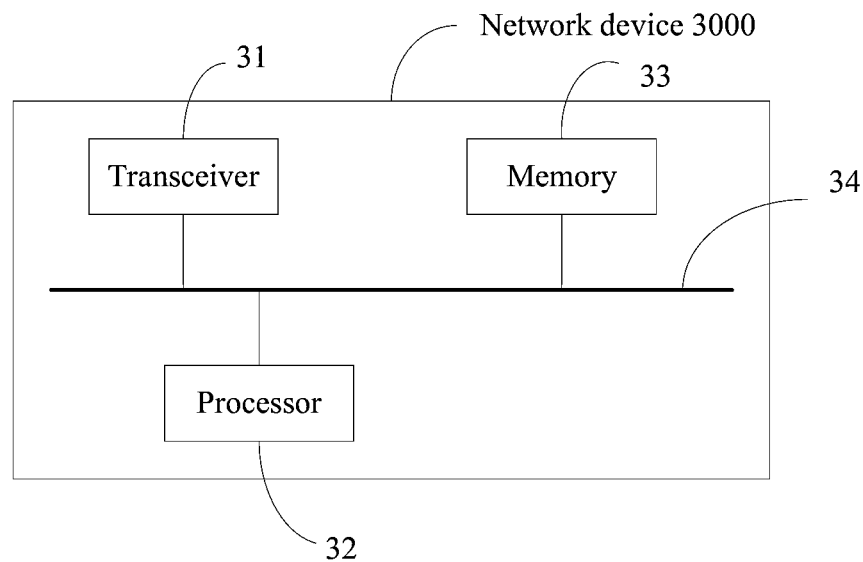
FIG. 6 is a schematic architectural diagram of hardware of a network device according to an embodiment of the present disclosure.

FIG. 6 is an architectural diagram of hardware of a network device according to an embodiment of the present disclosure. The network device 3000 may include a transceiver 31, a processor 32, and a memory 33. The transceiver 31, the processor 32, and the memory 33 are connected to each other by using a bus 34. A related function implemented by the processing unit 11 in FIG. 4 may be implemented by one or more processors 32, and a related function implemented by the sending unit 12 in FIG. 4 may be implemented by the transceiver 31.

The memory 33 includes but is not limited to a random access memory ( ), a read-only memory (ROM), an erasable programmable read only memory (EPROM), or a compact disc read-only memory (CD-ROM). The memory 33 is configured to store a related instruction and data.

The transceiver 31 is configured to send data and/or a signal and receive data and/or a signal. The transceiver 31 may include a transmitter and a receiver. The transmitter and the receiver perform a sending operation and a receiving operation, respectively. The transmitter and the receiver may be independent components, or may be an integral component.

The processor 32 may include one or more processors, for example, include one or more central processing units (CPU). When the processor 32 is one CPU, the CPU may be a single-core CPU, or may be a multi-core CPU.

The processor 33 is configured to support the network device in performing operation S101, shown in FIG. 3, of generating downlink control information corresponding to each of a plurality of code words to be sent to a terminal device. The memory 33 is configured to store program code and data of the network device.

The transceiver 31 is configured to communicate with the terminal device, and perform operation S102, shown in FIG. 3, of sending the downlink control information corresponding to the plurality of code words to the terminal device.

For details about operations performed by the processor 33 and the transceiver 31, refer to descriptions of the embodiment shown in FIG. 3, and details are not described herein again.

It is understood that FIG. 6 shows only a simplified design of the network device. In an actual application, each network device may further include another necessary component that includes but is not limited to: any quantity of transceivers, any quantity of processors, any quantity of controllers, and any quantity of memories. In addition, all network devices that can implement the present disclosure fall in the protection scope of the present disclosure.

According to the network device provided in this embodiment of the present disclosure, the network device generates the downlink control information corresponding to each of the plurality of code words to be sent to the terminal device, and the terminal device may demodulate data for the plurality of code words based on the downlink control information corresponding to the plurality of code words. This ensures that the terminal device correctly demodulates data in a multi-codeword transmission scenario.

Figure 7:
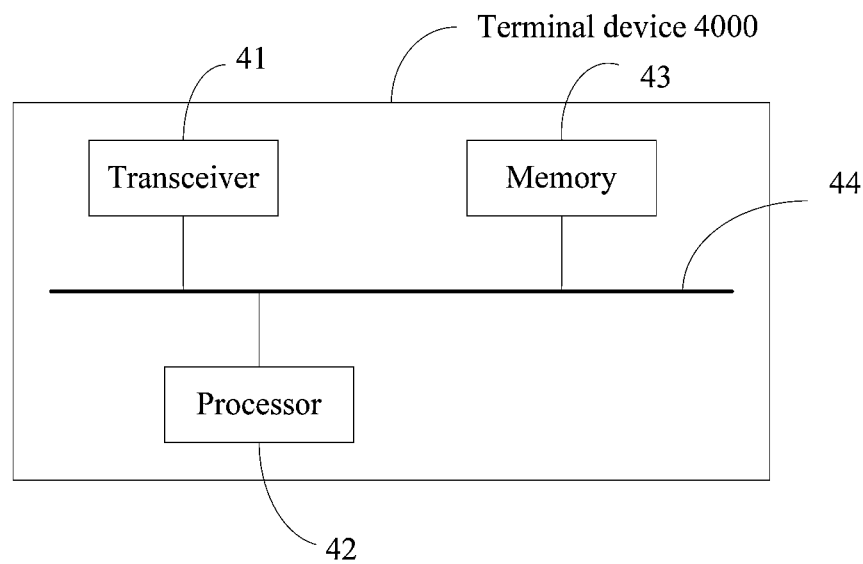
FIG. 7 is a schematic architectural diagram of hardware of a terminal device according to an embodiment of the present disclosure.

FIG. 7 is a schematic architectural diagram of hardware of a terminal device according to an embodiment of the present disclosure. The terminal device 4000 may include a transceiver 41, a processor 42, and a memory 43. The transceiver 41, the processor 42, and the memory 43 are connected to each other by using a bus 44. A related function implemented by the demodulation unit 22 in FIG. 5 may be implemented by one or more processors 42, and a related function implemented by the receiving unit 21 in FIG. 5 may be implemented by the transceiver 41.

The memory 43 includes but is not limited to a random access memory, a read-only memory, an erasable programmable read only memory, or a compact disc read-only memory. The memory 43 is configured to store a related instruction and data.

The transceiver 41 is configured to send data and/or a signal and receive data and/or a signal. The transceiver 41 may include a transmitter and a receiver. The transmitter and the receiver perform a sending operation and a receiving operation, respectively. The transmitter and the receiver may be independent components, or may be an integral component.

The processor 42 may include one or more processors, for example, include one or more central processing units. When the processor 42 is one CPU, the CPU may be a single-core CPU, or may be a multi-core CPU.

The processor 43 is configured to support the terminal device in performing operation S103, shown in FIG. 3, of demodulating data based on the downlink control information corresponding to the plurality of code words. The memory 43 is configured to store program code and data of the terminal device.

The transceiver 41 is configured to: communicate with the terminal device, perform operation S102 shown in FIG. 3, and receive the downlink control information that is corresponding to the plurality of code words and that is from the network device.

For details about operations performed by the processor 43 and the transceiver 41, refer to descriptions of the embodiment shown in FIG. 3, and details are not described herein again.

It is understood that FIG. 7 shows only a simplified design of the terminal device. In an actual application, each terminal device may further include another necessary component that includes but is not limited to: any quantity of transceivers, any quantity of processors, any quantity of controllers, and any quantity of memories. In addition, all terminal devices that can implement the present disclosure fall in the protection scope of the present disclosure.

According to the terminal device provided in this embodiment of the present disclosure, the terminal device receives the downlink control information that is corresponding to each of the plurality of code words and that is generated by the network device, and may demodulate data for the plurality of code words based on the downlink control information corresponding to the plurality of code words. This ensures that the terminal device correctly demodulates data in a multi-codeword transmission scenario.

A person of ordinary skill in the art may be aware that, the units and algorithm operations in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It is understood by a person skilled in the art that, for the purpose of convenient and brief description, for a detailed working process of the system, apparatus, and unit, refer to a corresponding process in the method embodiments. Details are not described herein again.

In the several embodiments provided in this application, it is understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedures or functions according to the embodiments of the present disclosure are all or partially generated. The computer may be a general-purpose computer, a special-purpose computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

The invention claimed is:

1. A multi-transmission node transmission method, comprising:
   generating, by a network device, a downlink control information (DCI) corresponding to each of a plurality of transmission nodes and corresponding to each of a plurality of code words that is to be sent to a terminal device from a transmission node;
   scheduling, by the network device, a physical downlink shared channel (PDSCH) corresponding to each of the plurality of transmission nodes and corresponding to the DCI; and
   sending, by the network device, the DCI corresponding to each of the plurality of transmission nodes to the terminal device, wherein the DCI is used by the terminal device to demodulate data for the code word that is carried on the PDSCH corresponding to the transmission node with a channel feature comprising parameters including a received angle of arrival, a primary angle of arrival, and a received angle of arrival spread.

2. The method according to claim 1, wherein the DCI corresponding to each of the plurality of transmission nodes comprises at least one of the following: a PDSCH resource element mapping and quasi-co-location indicator, one or more antenna ports, scrambling identity, or a number of layers.

3. The method according to claim 2, wherein PDSCH resource element mapping information in the plurality of transmission nodes is exactly the same, partially the same, or completely different.

4. The method according to claim 2, wherein the quasi-co-location indicator comprises at least one of the following parameters: a beam management reference signal configuration, a channel state information-reference signal (CSI-RS) configuration, or a demodulation reference signal (DMRS).

5. The method according to claim 2, wherein the quasi-co-location indicator indicates whether reference signals sent by at least two groups of antenna ports of the plurality of transmission nodes have the same channel feature.

6. The method according to claim 5, wherein the channel feature further comprising one or more of following parameters: delay spread, an average delay, Doppler spread, Doppler shift, an average gain, a receive beam number of the terminal device, a transmit/receive channel correlation, a spatial correlation of a receiver antenna, or an average angle of arrival.

7. A multi-transmission node transmission method, comprising:
   receiving, by a terminal device, a downlink control information (DCI) corresponding to each of a plurality of transmission nodes from a network device and corresponding to each of a plurality of code words that is to be sent to the terminal device from a transmission node, wherein the network device has scheduled a physical downlink shared channel (PDSCH) corresponding to each of the plurality of transmission nodes and corresponding to the DCI; and
   demodulating, by the terminal device using the DCI corresponding to each of the plurality of transmission nodes, data for the code word carried on the PDSCH corresponding to the transmission node with a channel feature comprising parameters including a received angle of arrival, a primary angle of arrival, and a received angle of arrival spread.

8. The method according to claim 7, wherein the DCI corresponding to each of the plurality of transmission nodes comprises at least one of the following: a PDSCH resource element mapping and quasi-co-location indicator, one or more antenna ports, scrambling identity, or a number of layers.

9. The method according to claim 8, wherein PDSCH resource element mapping information in the plurality of transmission nodes is exactly the same, partially the same, or completely different.

10. The method according to claim 8, wherein the quasi-co-location indicator comprises at least one of the following parameters: a beam management reference signal configuration, a channel state information-reference signal (CSI-RS) configuration, or a demodulation reference signal (DMRS).

11. The method according to claim 8, wherein the quasi-co-location indicator indicates whether reference signals sent by at least two groups of antenna ports of the plurality of transmission nodes have the same channel feature.

12. A communication apparatus, comprising:
   a receiver, configured to receive a downlink control information (DCI) corresponding to each of a plurality of transmission nodes from a network device and corresponding to each of a plurality of code words that is to be sent to the communication apparatus from a transmission node, wherein the network device has scheduled a physical downlink shared channel (PDSCH) corresponding to each of the plurality of transmission nodes and corresponding to the DCI; and
   a processor, configured to demodulate, using the DCI corresponding to each of the plurality of transmission nodes, data for the code word carried on the PDSCH corresponding to the transmission node with a channel feature comprising parameters including a received angle of arrival, a primary angle of arrival, and a received angle of arrival spread.

13. The communication apparatus according to claim 12, wherein the DCI corresponding to each of the plurality of transmission nodes comprises at least one of the following: a PDSCH resource element mapping and quasi-co-location indicator, one or more antenna ports, scrambling identity, or a number of layers.

14. The communication apparatus according to claim 13, wherein PDSCH resource element mapping information in the plurality of transmission nodes is exactly the same, partially the same, or completely different.

15. The communication apparatus according to claim 13, wherein the quasi-co-location indicator comprises at least one of the following parameters: a beam management reference signal configuration, a channel state information-reference signal (CSI-RS) configuration, or a demodulation reference signal (DMRS).

16. The communication apparatus according to claim 13, wherein the quasi-co-location indicator indicates whether reference signals sent by at least two groups of antenna ports of the plurality of transmission nodes have the same channel feature.

17. A communication apparatus, comprising:

a processor, configured to:

generate a downlink control information (DCI) corresponding to each of a plurality of transmission nodes and corresponding to each of a plurality of code words that is to be sent to a terminal device from a transmission node, and schedule a physical downlink shared channel (PDSCH) corresponding to each of the plurality of transmission nodes and corresponding to the DCI; and a transmitter, configured to send the DCI corresponding to each of the plurality of transmission nodes to the terminal device, wherein the DCI is used by the terminal device to demodulate data for the code word that is carried on the PDSCH corresponding to the transmission node with a channel feature comprising parameters including a received angle of arrival, a primary angle of arrival, and a received angle of arrival spread.

18. The communication apparatus according to claim 17, wherein the DCI corresponding to each of the plurality of transmission nodes comprises at least one of the following: a PDSCH resource element mapping and quasi-co-location indicator, one or more antenna ports, scrambling identity, or a number of layers.

19. The communication apparatus according to claim 18, wherein PDSCH resource element mapping information in the plurality of transmission nodes is exactly the same, partially the same, or completely different.

20. The communication apparatus according to claim 18, wherein the quasi-co-location indicator comprises at least one of the following parameters: a beam management reference signal configuration, a channel state information-reference signal (CSI-RS) configuration, or a demodulation reference signal (DMRS).

21. The communication apparatus according to claim 18, wherein the quasi-co-location indicator indicates whether reference signals sent by at least two groups of antenna ports of the plurality of transmission nodes have the same channel feature.

22. The communication apparatus according to claim 21, wherein the channel feature further comprising one or more of following parameters: delay spread, an average delay, Doppler spread, Doppler shift, an average gain, a receive beam number of the terminal device, a transmit/receive channel correlation, a spatial correlation of a receiver antenna, or an average angle of arrival.

* * * * *